United States Patent [19]

Hwang

[11] Patent Number: 4,866,656

[45] Date of Patent: Sep. 12, 1989

[54] HIGH-SPEED BINARY AND DECIMAL ARITHMETIC LOGIC UNIT

[75] Inventor: InSeok S. Hwang, Lower Macungie Township, Lehigh County, Pa.

[73] Assignee: American Telephone and Telegraph Company, AT&T Bell Laboratories, Murray Hill, N.J.

[21] Appl. No.: 938,670

[22] Filed: Dec. 5, 1986

[51] Int. Cl.[4] ................................................ G06F 7/50
[52] U.S. Cl. .................................. 364/768; 364/778; 364/781; 364/784
[58] Field of Search ................ 364/768, 778, 780–781, 364/783–784, 786–787, 736

[56] References Cited

U.S. PATENT DOCUMENTS

| | | | |
|---|---|---|---|
| 3,711,693 | 1/1973 | Dahl ..................................... | 364/771 |
| 4,001,570 | 1/1977 | Gooding et al. ..................... | 364/783 |
| 4,118,786 | 10/1978 | Levine et al. ........................ | 364/783 |
| 4,138,731 | 2/1979 | Kamimoto et al. ................. | 364/783 |
| 4,263,660 | 4/1981 | Prioste ................................. | 364/716 |
| 4,559,608 | 12/1985 | Young et al. ........................ | 364/786 |

OTHER PUBLICATIONS

J. W. Barrs, II et al., "PLA Binary and BCD Adder", IBM Technical Disclosure Bulletin, vol. 23, No. 1, Jun. 80.

"IEEE Transactions on Computers", vol. C-20, No. 8, Aug. 1971, High Speed Decimal Addition, pp. 862–866, by Martin S. Schmookler and Arnold Weinberger.

"Digital Computer Arithmetic", Copyright 1984 by McGraw-Hill, Inc., pp. 102–117, pp. 305–319, by Joseph J. F. Cavanagh, University of Santa Clara.

Primary Examiner—Gary V. Harkcom
Assistant Examiner—Long T. Nguyen
Attorney, Agent, or Firm—Scott W. McLellan

[57] ABSTRACT

A combined binary and binary coded decimal (BCD) arithmetic logic unit (binary/BCD ALU) having a binary adder adapted to perform decimal operations on BCD data without impacting the performance of binary operations. The combined binary/BCD ALU has a look-ahead carry binary adder for generating the binary sum or logical combination of inputs to the binary adder to an output (Y), the Y output being arranged in groups of four bits. The binary adder additionally provides carry outputs $Co_i$ of the binary additions from each of the groups of four bits of the Y output. A decimal correction unit, responsive to the Y and $Co_i$ outputs from the binary adder [ALU means], corrects the binary sum from the binary adder when performing BCD arithmetic. A multiplexer selects the Y output from the binary adder to a result output when performing operations on binary data. Alternately, the multiplexer selects the output from the decimal correction unit to the result output performing operations on BCD data.

10 Claims, 2 Drawing Sheets

HIGH-SPEED BINARY AND DECIMAL ARITHMETIC LOGIC UNIT

BACKGROUND OF THE INVENTION

This invention relates generally to non-binary radix adders and more specifically, to binary coded decimal (BCD) radix adders.

In the business environment, computers are used to perform data processing on a variety of repetitious tasks involving large amounts of numerical information. The processing is predominantly input/output intensive in contrast to number-crunching. For example, doing transactional data processing, such as in airline reservation or banking systems, the processing is predominantly information manipulation and recording. Operations using a computer in these applications must occur virtually instantaneously with no errors. In processing business transactions, such as payroll, the predominant numerical information processed is decimal; whereas in scientific and engineering processing, where number-crunching is prevalent, data is best handled in binary form. However, computer hardware as known in the prior art performs mathematical computations in binary instead of decimal notation and is optimized for high speed binary computations. For decimal digits to be use on such computer hardware, the decimal digits are represented internally to the computer as binary coded decimal (BCD) in which four bits are used to represent each decimal digit with a weighted 8-4-2-1 code. When these BCD digits are to be processed, the most common approach involves converting the BCD digits into binary, the desired function is performed, and the binary is converted back to BCD. These "translations" reduce the efficiency and performance of the computer system when performing data processing.

To overcome the necessity of translating the BCD to decimal and back again, the arithmetic portion of the computer, referred to as the arithmetic logic unit (ALU), is adapted to perform operations on BCD data as well as binary data. One approach involves having separate binary and BCD Arithmetic Units (AU). Binary ALUs are well known in the art and will not be discussed here. Exemplary BCD adders are described in chapter five of Digital Computer Airthmetic, by J. J. F. Cavanagh, 1984. On page 308 of said text, a BCD adder is described which includes logic for correcting intermediate sums which exceed nine. However, this technique uses ripple carry, i.e., for an N digit adder, there are N decimal adder stages with the carry out of one stage coupling to the carry in of a succeeding stage. Propagations of the carry from stage to stage slows down the operation of the adder which, for a large number of stages, makes this approach too slow for high-speed computation. An improvement in speed over the ripple carry approach discussed above is disclosed on pp. 310–312 of the above text. Here, correction is unconditionally performed on the intermediate sum and the uncorrected or corrected intermediate sum is selectively coupled to an output as the true BCD sum. Although this approach is faster than the ripple carry approach, additional hardware is needed. Further, the hardware in the above BCD adders does not lend themselves for operation binary data; little hardware can be shared between a binary ALU and a BCD ALU using these techniques.

Another approach which combines binary and BCD ALU circuitry is described in U.S. Pat. No. 4,263,660 issued to J. E. Prioste. This patent discloses an ALU which implements a parallel BCD addition technique described by M. S. Schmookler and A. Weinberger in "High Speed Decimal Addition," IEEE Transactions on Computers, PP. 862–865, Vol. C-20, No. 8, August 1971. However, this technique for BCD addition is optimal for emitter-coupled logic (ECL) (as utilized in the above U.S. patent) and does not lend itself for use in dynamic complementary metal-oxide-semiconductor (CMOS) circuitry since dynamic CMOS does not allow intermediate inverted outputs exclusive-or, and exclusive-nor. Integrating the technique disclosed by Schmookler, et al, in CMOS with a binary ALU would impede the performance of the binary ALU by slowing it down.

SUMMARY OF THE INVENTION

I have invented a binary and binary coded decimal (BCD) arithmetic logic unit (ALU), for performing at least arithmetic operations on binary data and arithmetic operations on BCD data, having an addend and an augend and a carry input as inputs, and a result output, comprising: look-ahead carry binary ALU means, responsive to the carry input, addend and augend, for generating at least a binary sum of the inputs to an output (Y), arranged in groups of four bits, and providing carry outputs ($Co_i$) of the binary additions from each of the groups of four bits of the Y output; decimal correction means, responsive to the Y and $Co_i$ outputs of the binary ALU means, for correcting the binary sum from the binary ALU means when performing BCD arithmetic, and; selecting means for selecting output from the binary ALU means or from the decimal correction means to the result output, wherein the output from the binary ALU means is selected for performing operations on binary data and output from the decimal correction means is selected for performing operations on BCD data. Further, a nines complementer is optionally disposed between the augend input and the binary ALU to allow decimal subtractions.

DETAILED DESCRIPTION

Figure 1:
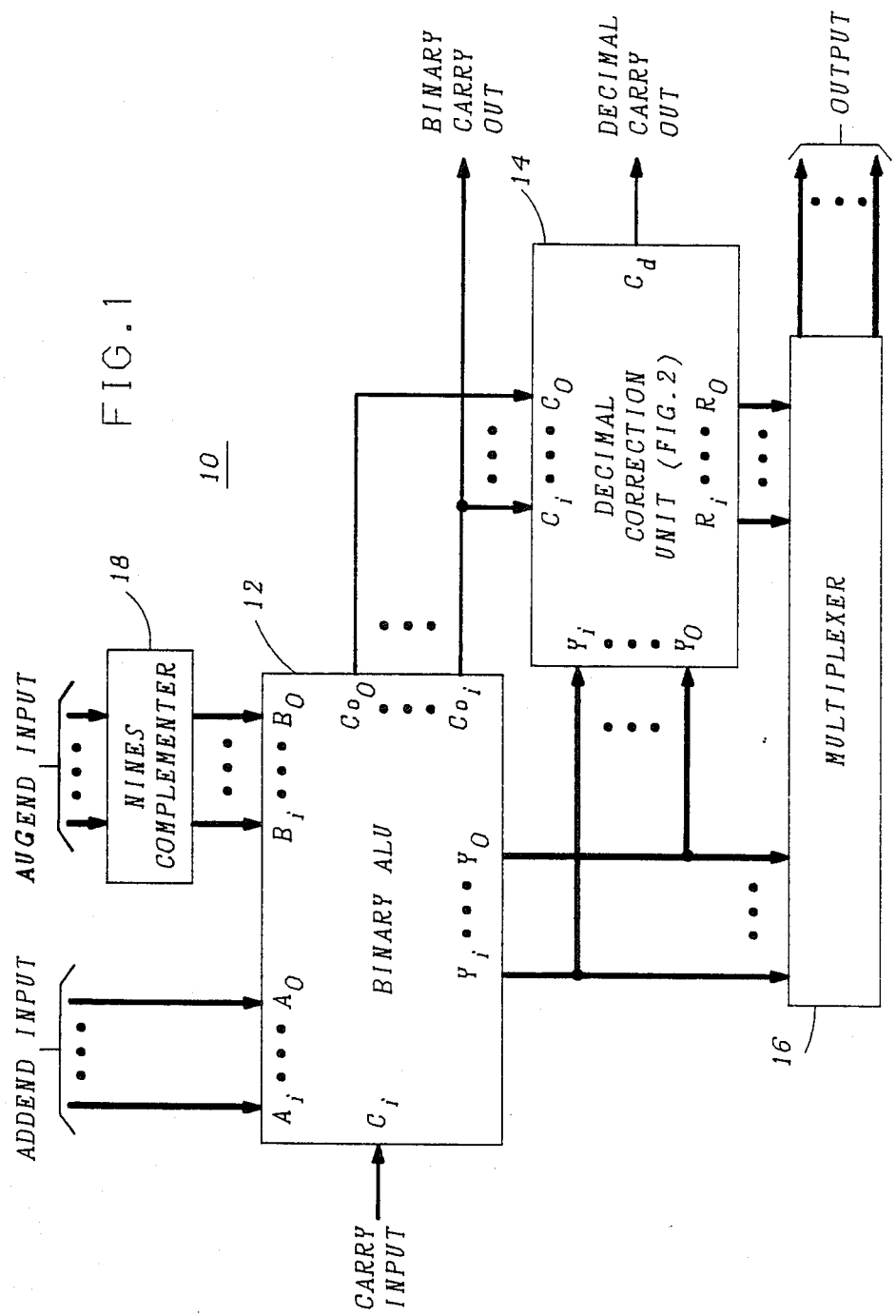
FIG. 1 is a block diagram of the binary and decimal ALU according to the invention.

Referring to FIG. 1, a binary and decimal arithmetic logic unit (ALU) 10 is diagrammed. A conventional binary ALU 12 performs binary arithmetic or logical operations on binary or binary coded decimal (BCD) data arranged in groups of four bits and applied to inputs $A_0$–$A_i$ and $B_0$–$B_i$, hereinafter referred to as addend and augend, respectively. An additional input, Cin, is a carry input for arithmetic operations. The results of such operations on the input data are passed corresponding in groups of four bits to the $Y_0$–$Y_i$ outputs. Carry outputs $Co_0Co_i$ are the intermediate carry outputs for arithmetic operations performed by the binary ALU 12, corresponding to the four bit groups $Y_0$–$Y_i$. Carry output $Co_i$, the highest order carry output, also forms the binary carry output. In the preferred embodiment of the invention, the binary ALU 12 is a look-ahead carry binary ALU adapted to provide the intermediate carry outputs $Co_0$–$Co_i$. However, it is understood that the binary ALU 12 could be constructed using conventional four-bit ripple carry adders. Decimal correction unit (DCU) 14 will be discussed in more detail below, however it is sufficient to state here that DCU 14 corrects the binary sum (outputs $Y_0$–$Y_i$) of BCD addend and augend applied to the binary ALU 12 and is responsive to the outputs $Co_0$–$Co_i$ from the ALU 12. Further, DCU 14 generates a decimal carry output Cd for BCD operations. Multiplexer 16 selects as output the binary sum output from ALU 12 for binary and logic operations while selecting output from the DCU 14 for BCD operations. Nines complementer 18 selectively performs complementation of the augend input to the binary ALU 12 for performing subtraction of the BCD data.

Figure 2:
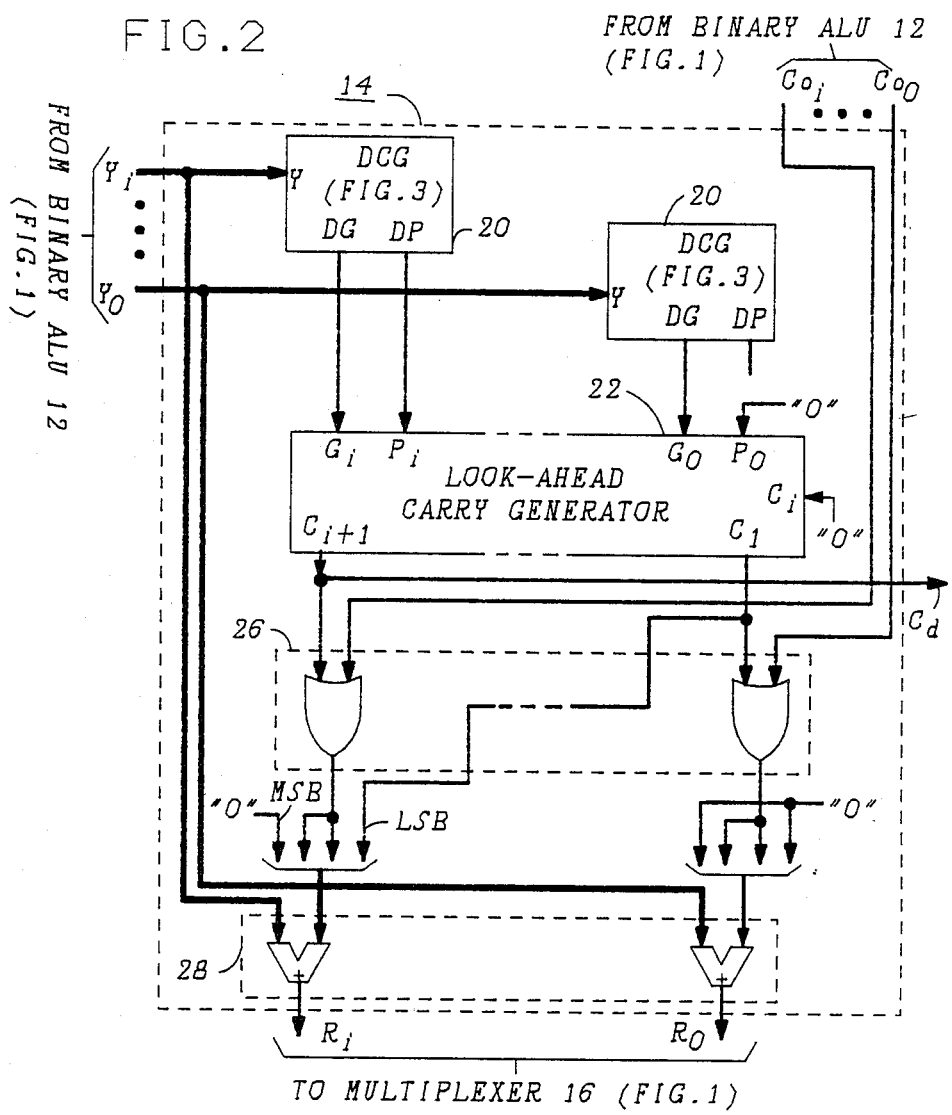
FIG. 2 details the decimal correction unit shown in FIG. 1.

Referringn to FIG. 2, the DCU 14 of FIG. 1 is diagrammed in more detail. The sum outputs $Y_0$–$Y_i$ from binary ALU 12 (FIG. 1) are coupled to the Y input of corresponding decimal carry generators (DCG) 20, each of which generate a decimal generate signal (DG) and a decimal propagate signal (DP). The DCGs 20 will be discussed in more detail below, however it is sufficient to state here that for each DCG 20 the DG signal is active when the value of the applied four bit group $Y_0$–$Y_i$ is greater than or equal to ten (BCD) and the DP output is active when the same four bit groups has a value greater than or equal to nine (BCD). The DG and DP signals from the DCGs 20 are coupled to corresponding generate ($G_0$–$G_i$) and propagate ($P_0$–$P_i$) inputs of a conventional look-ahead carry generator 22. The generator 22 is well known in the art in conjunction with binary adders. The generator 22 generates carry outputs $C_1$–$C_{i+1}$ from the corresponding $G_0$–$G_i$, $P_0$–$P_i$ and carry input $C_{in}$ as follows:

$$C_1 = G_0 + P_0 C_{in}$$

and $$C_{n+1} = G_n + P_n C_n, \; n=1, \ldots, i$$

It is noted that the $P_0$ input and the $C_{in}$ input are strapped to a logical "0" as there is no carry input to the DCU 14, giving $C_1 = G_0$ from the above equations. This simplifies the internal circuitry of the lowest order DCG 20 and generator 22 and, to one skilled in the art, it would be obvious to adapt the circuitry thusly. The carry outputs $C_1$–$C_{i+1}$ from the generator 22 and corresponding carry outputs $Co_0$–$Co_i$ from the binary ALU 12 (FIG. 1) are combined by OR gates 26 to form decimal correction signals which in turn drive corresponding four bit adders 28. By decimal correction I mean the adjustment to intermediate BCD sum which exceeds 10 (BCD) to form a valid BCD sum. The four bit adders 28 add to corresponding four bit groups $Y_0$–$Y_i$, applied to first inputs of adders 28, six (BCD) modulo sixteen, selectively applied to second inputs of adders 28, in response to the corresponding decimal correction signal from the OR gates 26. The addition of six (BCD) to the corresponding four bit groups $Y_0$–$Y_i$ corrects the binary sum from ALU12 (FIG. 1) should there be a decimal overflow from the binary addition by the binary ALU 12 (FIG. 1), i.e., when the four bit result $Y_0$–$Y_i$ is greater than ten (BCD). This occurs when the carry outputs $Co_0$–$Co_i$ from ALU12 (FIG. 1) indicates that the corresponding four bit group $Y_0$–$Y_i$ from the binary addition has a value greater than fifteen (binary) (e.g. nine (BCD) plus nine (BCD) produces two (BCD) plus a binary carry), the result is between fifteen (binary) and ten (binary) e.g. seven (BCD) plus six (BCD) produces thirteen (binary)) or the result is nine (binary) and a decimal carry in occurs. Further, each adder 28 has the least significant bit of the second input coupled to the carry output $C_1$–$C_{i+1}$ from the look-ahead carry generator 22 corresponding to the next lowest order four bit group $Y_0$–$Y_i$ for selectively adding one (binary) to the corresponding four bit group $Y_0$–$Y_i$. This allows for the overflow, as discussed above, to increment the succeeding four bit group accordingly. In addition, the $C_{i+1}$ output from generator 22 is the decimal carry output Cd from the DCU14.

Figure 3:
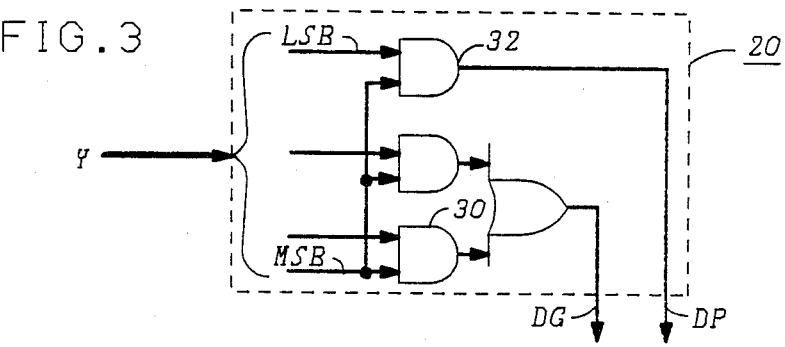
FIG. 3 is a logic diagram of the decimal carry generator (DCG) shown in FIG. 2.

Referring to FIG. 3, a DCG 20 (FIG. 2) is shown schematically. Logic circuit 30, composed of two AND gates and an OR gate responsive to the outputs of the AND gates, is responsive to the upper three bits of the four bit group Y to generate the DG signal. As discussed above in connection with FIG. 2, the DG signal is active when the four bit group Y has a value of ten (BCD) or greater. AND gate 32 generates the DP signal, again as discussed above. However, referring back to the equation for the look-ahead carry generator 22 (FIG. 2):

$$C_{n+1} = G_n + P_n C_n, \; n=1, \ldots, i$$

and recalling that DP is active when the four bit group Y is nine (BCD) or greater ($P_n$ coupling to a corresponding DP and $G_n$ coupling to a corresponding DG), it is obvious to one skilled in the art that the DG signal from the DCG 20 need only indicate a value of nine (BCD); from the above equation if DG is active, then DP is a "don't care". Therefore, AND gate 32 is responsive to the most and least significant bits of Y.

Operation of the invention is best illustrated by example. Taking an exemplary three BCD digit adder, the addend being 158 and the augend being 269, the desired result is 427. BCD addition using these examples showing the intermediate results is as follows:

| | | | | | | |
|---|---|---|---|---|---|---|
| ADDEND($A_2,A_1,A_0$) TO ALU12 (FIG. 1) | 1 | 5 | 8 | | | |
| AUGEND($B_2,B_1,B_0$) TO ALU12 (FIG. 1) | 2 | 6 | 9 | | | |
| BINARY SUM($Y_2,Y_1,Y_0$) FROM ALU12(FIG. 1) | 3 | C | 1 | 3 | C | 1 |
| ALU CARRIES ($Co_2,Co_1,Co_0$) FROM ALU12 (FIG. 1) | 0 | 0 | 1 | | | |
| DECIMAL GENERATE, PROPAGATE FROM DCGs 20 (FIG. 2) | 0,0 | 1,1 | 0,0 | | | |
| CARRY OUT ($C_3,C_2,C_1$) FROM GATES 26 (FIG. 2) | 0 | 1 | 0 | | | |
| DECIMAL CORRECTION FROM GATES 26 (FIG. 2) | NO | YES | YES | 0 | 6 | 6 |

| -continued | | | | | | |
|---|---|---|---|---|---|---|
| BCD CARRY FROM GEN. 22 (FIG. 2) | YES | NO | NO | +1 | +0 | +0 |
| CORRECTED BCD SUM($R_2,R_1,R_0$) FROM ADDERS 28 (FIG. 2) | | | | 4 | 2 | 7 |

As shown, BCD digits can be correctly added together without modifying the binary ALU portion of the adder such that binary performance is unaffected by the BCD operations. Subtraction so performed by taking the nines complement of the minuend and performing the above described BCD addition with the carry-in Cin, i.e. from the tens complement of the minuend and perform the BCD additions. With the foregoing in mind, the invention can be adapted to perform addition on any non-binary radix data by suitably adapting the DCU 14 (FIG. 1) to correct the binary sum from the binary ALU 12 (FIG. 1).

Having described the preferred embodiment of the invention, it is felt, therefore, that the invention should not be limited to the described embodiment, but rather should be limited only by the scope and spirit of the appended claims, in which I claim:

1. A binary and binary coded decimal (BCD) arithmetic logic unit (binary/BCD ALU), for performing at least arithmetic operations on BCD data, having an addend and an augend and a carry input as inputs, and a result output, the binary/BCD ALU comprising:
   look-ahead carry full binary adder, responsive to the carry input, addend and augend, for generating at least a binary sum of the inputs to an output (Y), the Y output arranged in groups of four bits, and providing carry outputs ($Co_i$) of the binary additions corresponding to each group of four bits of the Y output;
   decimal correction means, responsive to the Y and $Co_i$ outputs of the binary adder, for correcting the binary sum from the binary adder when performing BCD arithmetic; and
   selecting means for selecting output from the binary adder or from the decimal correction means to the result output of the binary/BCD ALU;
   wherein the output from the binary adder is selected from the binary/BCD ALU performs operations on binary data and the output from the decimal correction means is selected when the binary/BCD ALU performs operations on BCD data.

2. The binary/BCD ALU in claim 1, further comprising a complementing means, disposed between the augend input and the binary adder, for selectively taking the nines complement of the augend.

3. The binary/BCD ALU in claim 1, wherein the binary adder includes means to subtract and perform logical operations on binary data.

4. The binary/BCD ALU in claim 1 wherein the decimal correction means further comprises:
   first logic means, responsive to the Y output of the binary adder, for generating decimal propagate and decimal generate signals in correspondence with the groups of four bits of the Y output, wherein the decimal propagate signal is active when the corresponding four bits have a value of nine or greater and the decimal generate signal is active when the corresponding four bits have a value of ten or greater,
   look-ahead carry generator means, responsive to the decimal propagate and generate signals from the first logic means, for generating corresponding carry signals;
   second logic means for combining the corresponding carry signals from the look-ahead carry generator means and the $Co_i$ outputs from the binary adder to form corresponding correction signals, and;
   means, responsive to the Y output of the binary adder, for selectively correcting the corresponding groups of four bits of the Y output in response to the corresponding correction signals from the second logic means.

5. The binary/BCD ALU in claim 4, wherein the second logic means comprises a plurality of "OR" gates.

6. The binary/BCD ALU in claim 4, wherein the means comprises:
   a plurality of adder means, responsive to the corresponding correction signals from the second logic means, for selectively adding six to the corresponding group of four bits from the Y output.

7. The binary/BCD ALU in claim 6, wherein each of the plurality of adder means is further responsive to the carry output from the look-ahead carry means corresponds to the preceding four bits of the Y output for selectively adding an additional one to the corresponding group of four bits.

8. The binary/BCD ALU in claim 1, further comprising:
   a nines complementer for complementing the augend input to the look-ahead carry full binary adder when performing subtraction of BCD data.

9. A method for adding at least two binary coded decimal (BCD) numbers, referred to as addend and augend, characterized by steps comprising:
   adding the augend and addend with a binary adder, generating a sum and carry outputs, the carry outputs corresponding to groups of four bits of the sum;
   generating decimal propagate and decimal signals, corresponding to the groups of four bits of the sum, the decimal propagate signal indicating that the corresponding group of four bits has a value of at least nine and the decimal generate signal indicating that the corresponding group of four bits has a value of at least ten;
   generating carry signals with a look-ahead carry generator from the corresponding decimal propagate and decimal generate signals; and,
   selectively adding six to corresponding groups of four bits of the sum in response to the corresponding carry outputs from the binary adder or the corresponding carry signals.

10. The method for adding BCD numbers in claim 9, further comprising the steps of:
    selectively adding one to each group of four bits of the sum in response to the carry signal corresponding to the next lowest group of four bits of the sum.

* * * * *